(12) United States Patent
Zhao et al.

(10) Patent No.: US 12,041,585 B2
(45) Date of Patent: Jul. 16, 2024

(54) RESOURCE SELECTION METHOD IN INTERNET OF VEHICLES SYSTEM AND USER EQUIPMENT THEREOF

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 355 days.

(21) Appl. No.: 17/539,594

(22) Filed: Dec. 1, 2021

(65) Prior Publication Data
US 2022/0095281 A1 Mar. 24, 2022

Related U.S. Application Data

(63) Continuation of application No. PCT/CN2019/090437, filed on Jun. 6, 2019.

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04W 52/14* (2013.01); *H04W 72/1263* (2013.01); *H04W 72/542* (2023.01)

(58) Field of Classification Search
CPC ... H04W 72/02; H04W 72/542; H04W 52/14; H04B 17/318
See application file for complete search history.

(56) References Cited

U.S. PATENT DOCUMENTS

| 2021/0160817 A1* | 5/2021 | Khoryaev | H04W 72/542 |
| 2021/0219269 A1* | 7/2021 | Lee | H04W 24/10 |
| 2021/0392707 A1* | 12/2021 | Do | H04W 72/02 |

FOREIGN PATENT DOCUMENTS

| CN | 108024266 A | 5/2018 |
| CN | 108633065 A | 10/2018 |
| CN | 109644436 A | 4/2019 |

OTHER PUBLICATIONS

International Search Report and Written Opinion date Jan. 15, 2020 in International Application No. PCT/CN2019/090437. English translation attached.

(Continued)

*Primary Examiner* — Jamal Javaid
*Assistant Examiner* — Ryan C Kavleski
(74) *Attorney, Agent, or Firm* — Sheppard, Mullin, Richter & Hampton LLP

(57) ABSTRACT

A resource selection method in a Device-to-Device (D2D) system, and a terminal device thereof are provided. The method includes: obtaining, by a terminal device, a first set of resources, resources in the first set of resources being candidate transmission resources; performing sensing, by the terminal device, to exclude an unavailable resource from the first set of resources based on measured Reference Signal Received Power (RSRP) on a resource occupied by another transmitting terminal device and an RSRP threshold; and selecting, by the terminal device, a resource from the first set of resources for data transmission.

18 Claims, 10 Drawing Sheets

(51) Int. Cl.
*H04W 52/14* (2009.01)
*H04W 72/1263* (2023.01)
*H04W 72/542* (2023.01)

(56) References Cited

OTHER PUBLICATIONS

Intel Corporation. "Transmitter Behavior for Sidelink Resource (Re)selection" 3GPP TSG RAN WG1 Meeting #86, R1-166512, Aug. 13, 2016 (Aug. 13, 2016), Section 4 of the text, 6 pages.
Fujitsu. "Further Considerations on NR-V2X Resource Selection Procedure of Mode 2(a) in Mixture Scenario", 3GPP TSG RAN WG1 #96, R1-1901947, Feb. 15, 2019 (Feb. 15, 2019), Section 4.2 of the text, 7 pages.

* cited by examiner

RESOURCE SELECTION METHOD IN INTERNET OF VEHICLES SYSTEM AND USER EQUIPMENT THEREOF

CROSS-REFERENCE TO RELATED APPLICATION

The present application is a continuation of International Application No. PCT/CN2019/090437, filed on Jun. 6, 2019, which is incorporated herein by reference in its entirety.

TECHNICAL FIELD

The present disclosure relates to the field of communication technologies, and more particularly, to the field of Internet of vehicles technologies.

BACKGROUND

Conventional cellular systems receive or transmit communication data through base stations. Unlike the conventional cellular systems, an Internet of Vehicles system uses a direct Device to Device (D2D) communication method, which is a Sidelink (SL) transmission technology that has higher spectral efficiency and lower transmission latency.

3rd Generation Partnership Project (3GPP) defines two transmission modes for the Internet of Vehicles system. For one transmission mode, the base station allocates transmission resources of a terminal device. For the other transmission mode, a vehicle-mounted terminal device selects transmission resources from a resource pool for transmission. The transmission resources can be selected by means of sensing or selected randomly.

In New Radio-Vehicle to Everything (NR-V2X), i.e., a V2X wireless communication technology evolved from an NR system based on a 5th Generation (5G) mobile communication system, higher requirements are made to data interactions between vehicles, e.g., higher throughput, shorter latency, higher reliability, larger coverage, and more flexible resource allocations. In addition to a broadcast transmission mode, a unicast transmission mode, a multicast transmission mode, and a power control mechanism are introduced. A sidelink feedback channel is also introduced to improve reliability.

SUMMARY

The present disclosure provides the following technical solutions.

In an aspect, a resource selection method in a D2D system is provided. The method includes: obtaining, by a terminal device, a first set of resources, wherein resources in the first set of resources are candidate transmission resources; performing, by the terminal device, sensing to exclude an unavailable resource from the first set of resources based on measured Reference Signal Received Power (RSRP) on a resource occupied by another transmitting terminal device and an RSRP threshold; and selecting, by the terminal device, a resource from the first set of resources for data transmission.

In another aspect, a terminal device in a D2D system is provided. The terminal device includes a processor and a memory. The memory stores at least one instruction, and the at least one instruction is loaded and executed by the processor to perform the resource selection method as described above.

DESCRIPTION OF EMBODIMENTS

Figure 1:
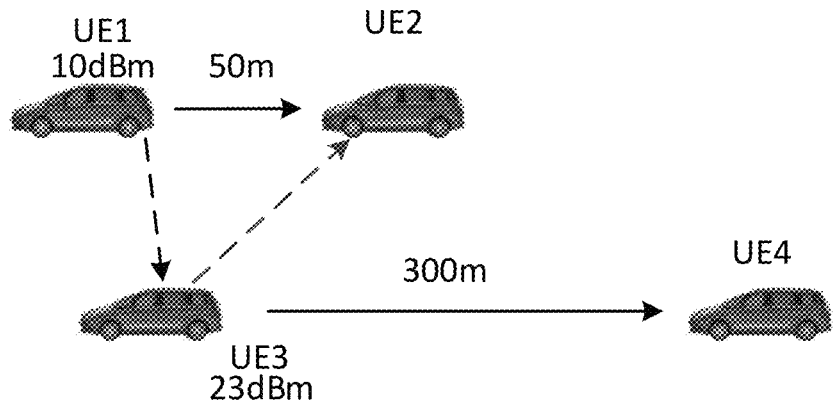
FIG. 1 is a schematic diagram illustrating an application scenario according to an embodiment of the present disclosure.

In order to make objects, technical solutions, and advantages of the present disclosure clearer, the following describes the present disclosure in detail with reference to the accompanying drawings and embodiments. It should be understood that the embodiments described here are only used to explain, rather than to limit, the present disclosure. However, the present disclosure can be implemented in different forms and is not limited to the embodiments described herein. On the contrary, the embodiments are provided to facilitate thorough and comprehensive understanding of the present disclosure.

Unless otherwise defined, all technical and scientific terms used herein have the same meaning as commonly understood by those skilled in the art of the present disclosure. Terms in the specification of the present disclosure herein are only used for the purpose of describing specific embodiments, and are not intended to limit the present disclosure. The term "and/or" as used herein includes any and all combinations of one or more related listed items.

The following is a correspondence table of abbreviations of key terms and full English names of the key terms.

| Abbreviations | Full English names |
|---|---|
| LTE | Long Term Evaluation |
| V2V | Vehicle to Vehicle |
| V2X | Vehicle to Everything |
| D2D | Device to Device |
| SCI | Sidelink Control Information |
| PSCCH | Physical Sidelink Control Channel |
| PSSCH | Physical Sidelink Shared Channel |
| S-RSRP | Sidelink Reference Signal Received Power |
| S-RSSI | Sidelink Received Signal Strength Indicator |
| DMRS | Demodulation Reference Signal |

For the broadcast transmission mode in New Radio-Vehicle to Everything (NR-V2X), in order to allow more terminal devices to receive data, a transmitting terminal device usually uses maximum transmission power to transmit data. However, for the unicast transmission mode or the multicast transmission mode, due to a limited number of receiving terminal devices or a limited distance, the transmitting terminal device can adjust the transmission power based on an SL status, so as to achieve a purpose of energy saving and reduce interference to other transmission links.

However, with the introduction of power control, the transmitting terminal device can reduce the transmission power under certain conditions, which may cause other terminal devices to mistakenly determine that transmission resources used by the transmitting terminal device are available during sensing, thereby leading to a problem of occupying transmission resources of a user at low transmission power and interfering with transmission of the user at low transmission power.

Embodiments of the present disclosure disclose a resource selection method applied in an Internet of vehicles system and a terminal device thereof. A system architecture used in the following specific embodiments of the present disclosure is that, in the NR-V2X, a transmitting terminal device needs to select a transmission resource before transmitting data. In the Internet of vehicles system, the NR-V2X not only has a communication mode of broadcast transmission, but also introduces communication modes of unicast transmission and multicast transmission, and a power control mechanism. Since in the unicast transmission and the multicast transmission, a terminal device may perform power control to reduce transmission power, another transmitting terminal device may mistakenly determine that a transmission resource used by the terminal device performing the power control is available when the other transmitting terminal device performs sensing to select a transmission resource, thereby leading to a problem of occupying the transmission resource of a terminal device with low transmission power and interfering with transmission of the terminal device with low transmission power. Therefore, when selecting a transmission resource, the other transmitting terminal device needs to identify and exclude transmission resources to avoid large transmission interference caused by a large difference in transmission power between different terminal devices.

As illustrated in FIG. 1, suppose that there are four vehicle-mounted terminal devices UE1, UE2, UE3, and UE4 in the system, UE1 and UE2 adopt the unicast transmission, and UE3 adopts the broadcast transmission. When UE1 and UE2 perform unicast communication, the power control is performed. Since a distance between UE1 and UE2 is very short, transmission power of UE1 is very low. For example, the transmission power of UE1 is 10 dBm. When UE3 performs sensing, since the transmission power of UE1 is low, UE3 measures that PSSCH-RSRP of UE1 is very low. Consequently, UE3 determines that interference on a transmission resource used by UE1 is very low, and that the transmission resource is an available resource. If UE3 selects the transmission resource and performs the broadcast transmission, UE3 usually uses maximum power (for example, 23 dBm) to transmit data, in order to ensure that the data of UE3 can be received by more users, such as UE4. Consequently, signals of UE3 interfere with the reception of UE2, causing UE2 to fail to receive data from UE1.

The following specific embodiments of the present disclosure will elaborate on how to exclude a resource occupied by the terminal device with a considerably different transmission power, thereby reducing or avoiding an impact of the power control on a sensing and resource selection process of the terminal device, and reducing the resulting transmission interference.

Embodiment 1

Figure 2:
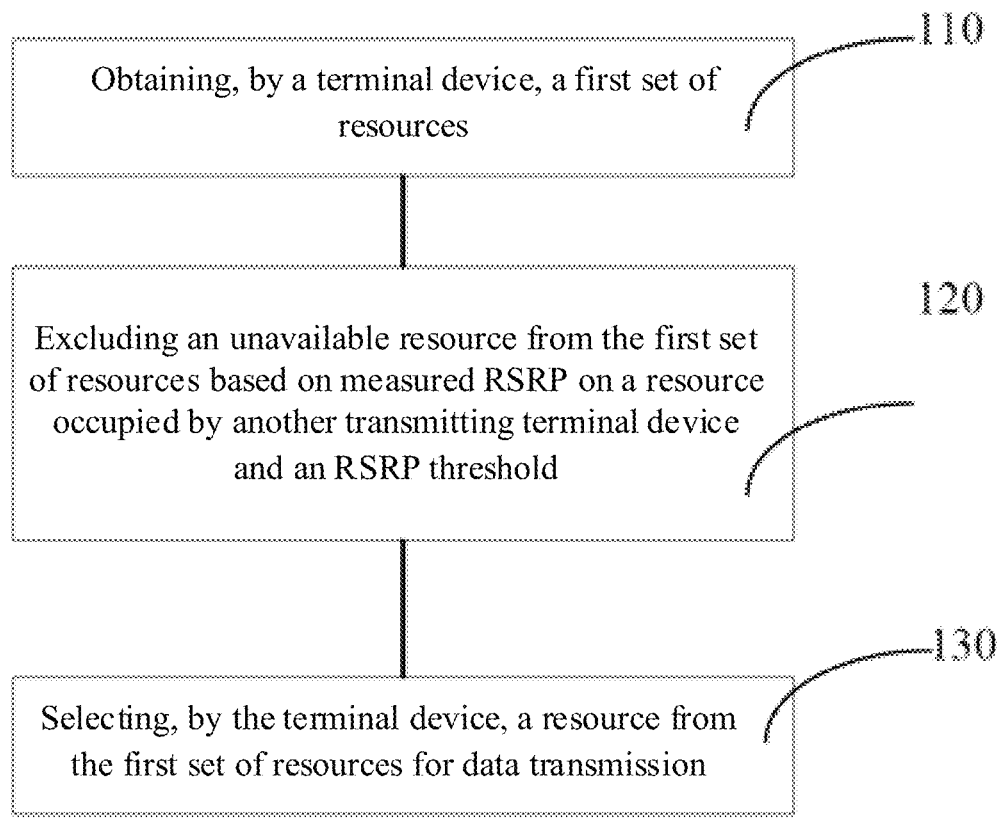
FIG. 2 is a flowchart illustrating a resource selection method in a D2D system according to Embodiment 1 of the present disclosure.

FIG. 2 is a flowchart illustrating a resource selection method in a D2D system according to Embodiment 1 of the present disclosure. The method can be applied in a terminal device. The method includes the following operations.

At block 110, the terminal device obtains a first set of resources. Resources in the first set of resources are candidate transmission resources.

At block 120, the terminal device performs sensing to exclude an unavailable resource from the first set of resources based on measured RSRP on a resource occupied by another transmitting terminal device and an RSRP threshold.

At block 130, the terminal device selects a resource from the first set of resources for data transmission.

Specifically, the terminal device performs a selection in the first set of resources in accordance with a certain criterion. For example, the operation at block 130 may specifically include the following operations.

At block 131, the terminal device performs S-RSSI detection on the resources in the first set of resources, sorts the resources by energy levels based on S-RSSI detection values, and puts a part of (for example, 20% of) the resources with the lowest energy into a second set of resources. The terminal device performing the S-RSSI detection on the resources in the first set of resources includes the terminal device performing an S-RSSI detection on resources in a sensing window, and calculating S-RSSIs of the resources in the first set of resources based on results of the S-RSSI detection.

At block 132, the terminal device selects a resource from the second set of resources for data transmission. In at least one embodiment, the terminal device selects with equal probability a resource from the second set of resources for data transmission.

In at least one embodiment, after block 120, if a number of available resources in the first set of resources is smaller than a threshold (for example, the threshold is 20% of a number of all candidate resources in a resource selection window, or 20% of a total number of initial resources in the first set of resources), the terminal device performing the sensing raises the RSRP threshold by a certain value, such as 3 dB, and then repeats the resource exclusion process in the above block 120.

In at least one embodiment, the first set of resources is a set of resources composed of resources in the resource selection window.

In at least one embodiment, a size of the candidate transmission resources is determined based on data to be transmitted by the terminal device.

Embodiment 2

Figure 3:
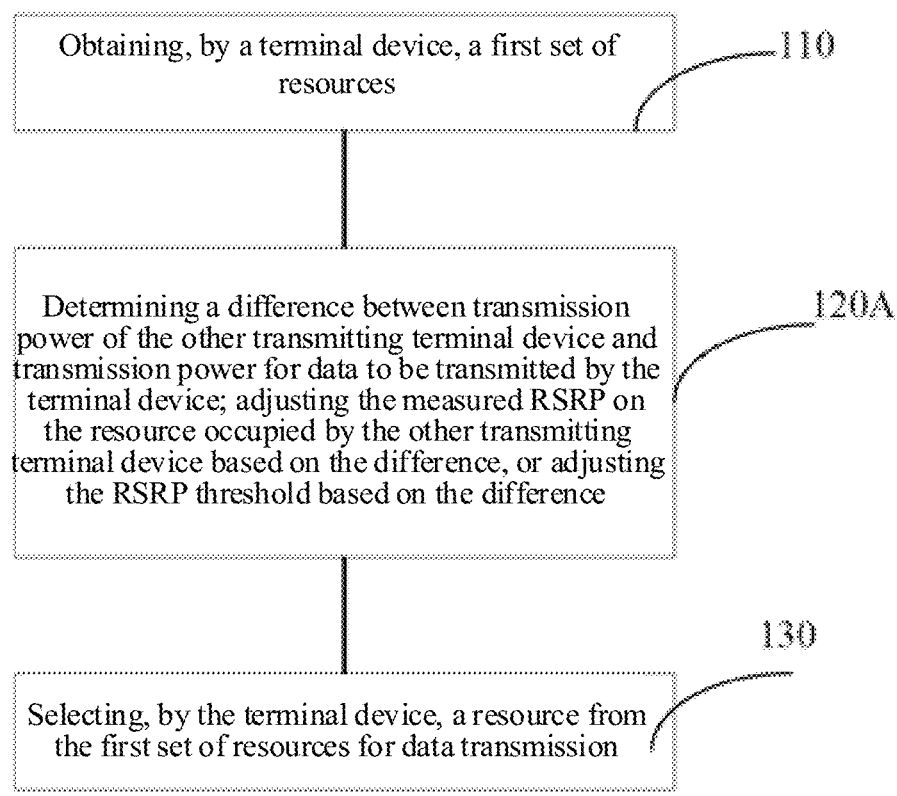
FIG. 3 is a flowchart illustrating a resource selection method in a D2D system according to Embodiment 2 of the present disclosure.

FIG. 3 is a flowchart illustrating a resource selection method in a D2D system according to Embodiment 2 of the present disclosure. Block 110 and block 130 are the same as in Embodiment 1. Embodiment 2 differs from Embodiment 1 above in that block 120 is specifically block 120A. At block 120A, a difference between transmission power of the other transmitting terminal device and transmission power for data to be transmitted by the terminal device is determined; the measured RSRP on the resource occupied by the other transmitting terminal device is adjusted based on the difference, or the RSRP threshold is adjusted based on the difference; and the unavailable resource is excluded from the first set of resources based on the adjusted RSRP or the adjusted RSRP threshold. Specific implementations are as follows.

Scheme 1

Figure 4:
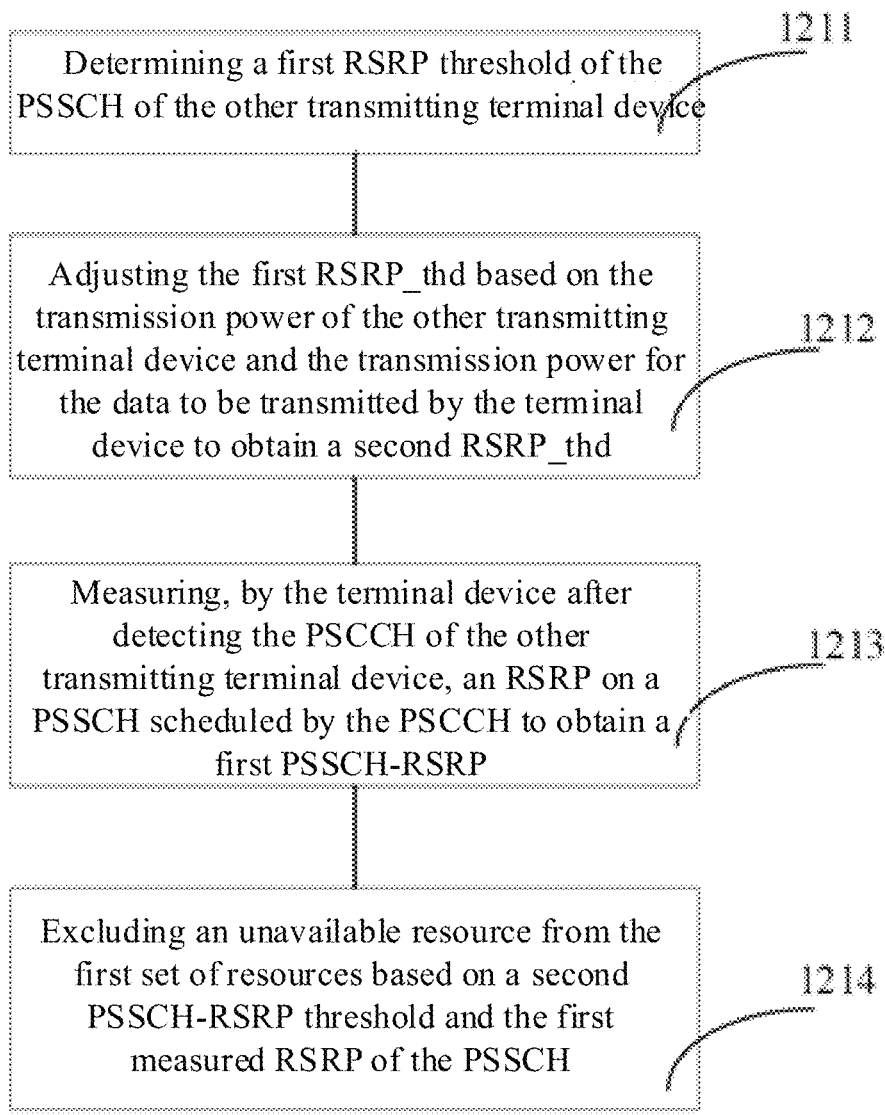
FIG. 4 is a flowchart illustrating Scheme 1 of Embodiment 2.

Referring to FIG. 4, the operation at block 120A can include the following operations.

At block 1211, a PSSCH-RSRP threshold is determined, i.e., a first PSSCH-RSRP threshold (hereinafter RSRP_thd is used to represent the PSSCH-RSRP threshold). Specifically, the first RSRP_thd can be determined based on detected priority information P1 carried in a PSCCH of the other transmitting terminal device and priority information P2 of data to be transmitted by the terminal device. For example, a mapping relationship between priorities and PSSCH-RSRP thresholds is configured by preconfiguration or a network. The terminal device that performs the sensing can determine the RSRP_thd of the PSSCH by looking up the mapping relationship based on P1 received from the other transmitting terminal device and P2 of the terminal device that performs the sensing.

At block 1212, the first RSRP_thd is adjusted based on the transmission power of the other transmitting terminal device and the transmission power for the data to be transmitted by the terminal device to obtain a second RSRP_thd.

At block 1213, after detecting the PSCCH of the other transmitting terminal device, the terminal device measures an RSRP on a PSSCH scheduled by the PSCCH to obtain a first PSSCH-RSRP. It should be noted that the operation at block 1213 is not limited to this sequence. The operation at block 1213 can be prior to that at block 1211 or subsequent to that at block 1212.

At block 1214, an unavailable resource in the first set of resources is excluded based on a second PSSCH-RSRP threshold and the first PSSCH-RSRP. Specifically, when the first PSSCH-RSRP of the PSSCH is greater than or equal to the second RSRP_thd, the resource occupied by the other transmitting terminal device is excluded from the first set of resources.

Specifically, At block 1212, the transmission power of the other terminal device may be determined based on information carried in the PSCCH.

PSCCH carries SCI. The SCI carries first indication information. The first indication information is used to determine the transmission power of the other transmitting terminal device. The terminal device adjusts the first RSRP_thd based on the first indication information and the transmission power for the data to be transmitted by the terminal device. More specifically, the transmission power indication information may be any one of the following information.

The first type is information used to indicate the transmission power of the other transmitting terminal device. For example, the transmission power of the terminal device is quantized. The quantized transmission power information is carried in the SCI.

For example, maximum transmission power of the terminal device is 23 dBm. If the transmission power of the terminal device is smaller than 0 dBm, the transmission power is quantized as 0 dBm. If the transmission power of the terminal device is between [0, 23] dBm, the transmission power is processed in a round-up manner. For example, if the transmission power of the terminal device is 5.3 dBm, the transmission power is quantized as 6 dBm; if the transmission power of the terminal device is 6.8 dBm, the transmission power is quantized as 7 dBm, and so on. The quantized transmission power of the terminal device is an integer between [0, 23]. That is, five bits are required to represent any quantized transmission power value. The transmission power of the terminal device can be determined based on 5-bit transmission power indication information carried in the SCI.

The second type is a power level identifier. For example, the transmission power is divided into different levels, and corresponding transmission power can be determined based on the power level identifier.

For example, level division is performed on the transmission power of the terminal device. If the transmission power of the terminal device is smaller than or equal to 0 dBm, the transmission power is recorded as the first level; if the transmission power falls within (0, 1] dBm, the transmission power is recorded as the second level; if the transmission power falls within (1, 2] dBm, the transmission power is recorded as the third level; if the transmission power falls within (2, 3] dBm, the transmission power is recorded as the fourth level; . . . ; and if the transmission power falls within (22, 23] dBm, the transmission power is recorded as the twenty-fourth level. (A, B] represents that the transmission power is greater than A and is smaller than or equal to B. Therefore, five bits are required to represent any power level. A transmission power level of the terminal device can be determined based on the 5-bit transmission power indication information carried in the SCI.

In at least one embodiment, in each power level, maximum transmission power in the level is recorded as the transmission power of the terminal device. For example, if the power level of the terminal device is the third level, 2 dBm is determined as the transmission power of the terminal device.

The third type is information used to indicate a difference between the transmission power of the terminal device and first power. The first power may be at least one of the following.

1, The maximum transmission power of the terminal device, e.g., the maximum transmission power of the terminal device being 23 dBm.

2, A pre-configured power value, e.g., power of 23 dBm pre-defined through a protocol.

3, Power determined based on parameter information carried in the SCI, e.g., a threshold determined based on the priority information in the SCI, for example, the RSRP threshold determined based on the priority.

Further, the power difference information can be quantized or divided into different levels. For a specific quantization method or level division method, reference can be made to the method applied for the first type or the second type of information, and details thereof will be omitted here.

In at least one embodiment, if the terminal device performing the sensing detects that the transmission power of the other terminal device is greater than or equal to the transmission power for the data to be transmitted by the terminal device performing the sensing, the terminal device performing the sensing does not adjust the RSRP_thd.

For example, as illustrated in FIG. 1, assuming that UE1 is sensing, UE1 can detect the PSCCH of the other transmitting terminal device UE3 and learn that the transmission power of UE3 is 23 dBm, which is 10 dBm greater than the transmission power of UE1, and thus UE1 does not adjust the RSRP threshold during sensing.

For example, as illustrated in FIG. 1, assuming that UE3 is sensing, UE3 can detect the PSCCH of the other transmitting terminal device UE1 and learn that the transmission power of UE1, PtUE1, is 10 dBm, and the transmission power of UE3, PtUE3, is 23 dBm. UE3 determines the first PSSCH-RSRP threshold RSRP_thd1. The RSRP_thd1 may be determined based on the detected priority information P1 carried in the SCI of the other transmitting terminal device and the priority information P2 of the data to be transmitted by the terminal device. It is assumed that it is determined based on P1 and P2 that RSRP_thd1=4 dB. The RSRP_thd1 is adjusted based on the transmission power of the other transmitting terminal device and the transmission power for the data to be transmitted by the terminal device to obtain the second PSSCH-RSRP threshold RSRP_thd2. For example, RSRP_thd2=RSRP_thd1+A, where a parameter A represents a difference between the transmission power of the other transmitting terminal device and the transmission power for the data to be transmitted by the terminal device. As illustrated in FIG. 1, RSRP_thd2=4+(10−23)=−9 dB. UE3 measures the PSSCH-RSRP1 of the other transmitting device UE1. The PSSCH-RSRP1 is compared with the RSRP_thd2. If PSSCH-RSRP1 is greater than or equal to the RSRP_thd2, the transmission resource used by UE1 is excluded. If PSSCH-RSRP1 is smaller than the RSRP_thd2, it is determined that the transmission resource used by the UE1 is available.

Scheme 2

Figure 5:
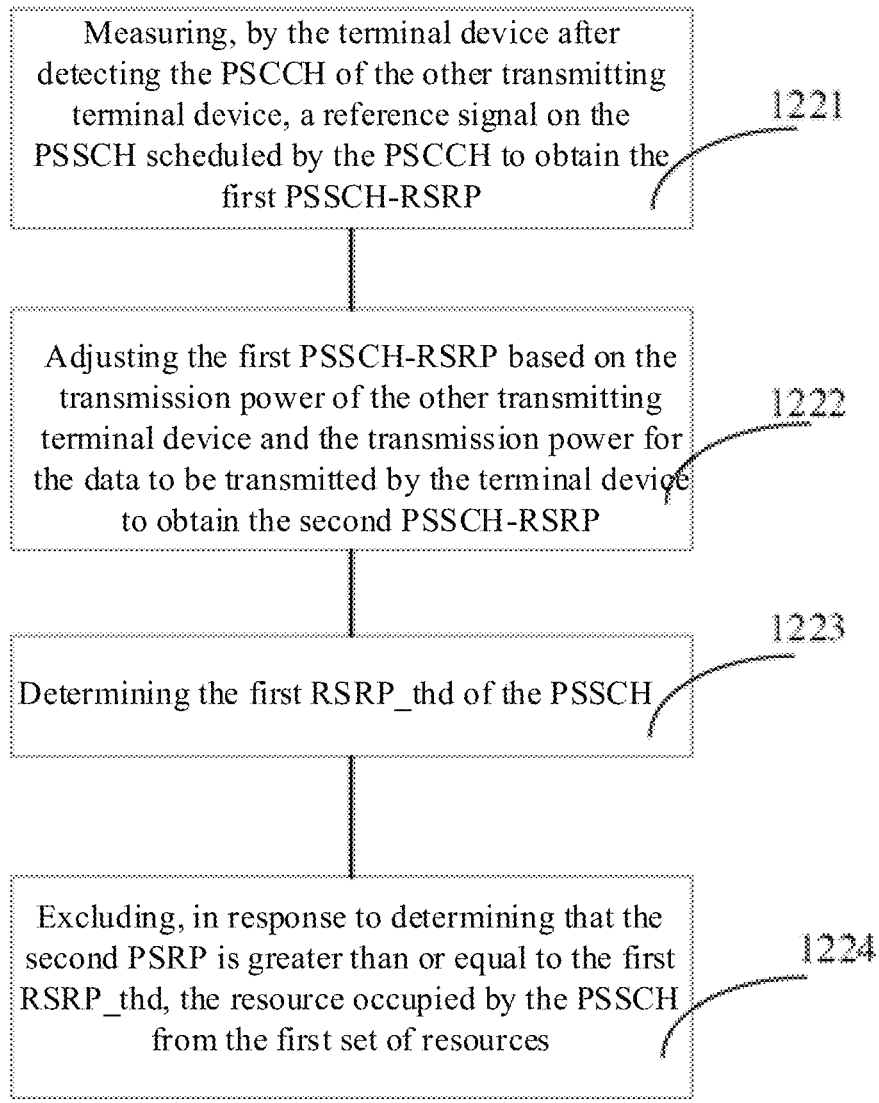
FIG. 5 is a flowchart illustrating Scheme 2 of Embodiment 2.

Referring to FIG. 5, the operation at block 120 specifically includes the following operations.

At block 1221, after detecting the PSCCH of the other transmitting terminal device, the terminal device measures a reference signal on the PSSCH scheduled by the PSCCH to obtain the first PSSCH-RSRP.

At block 1222, the first PSSCH-RSRP is adjusted based on the transmission power of the other transmitting terminal device and the transmission power for the data to be transmitted by the terminal device, to obtain the second PSSCH-RSRP. Specifically, for the method for obtaining the transmission power of the other transmitting terminal device, reference can be made to specific description of block 1212 described above, and details thereof will be omitted here.

At block 1223, the first RSRP_thd of the PSSCH is determined. Specifically, the first RSRP_thd can be determined based on the detected priority information P1 carried in the PSCCH of the other transmitting terminal device and the priority information P2 of the data to be transmitted by the terminal device. It should be noted that the operation at block 1223 is not limited to this sequence. The operation at block 1223 can be prior to that at block 1221 or subsequent to that at block 1222.

At block 1224, the unavailable resource in the first set of resources can be excluded based on the first RSRP_thd and the second PSSCH-RSRP. Specifically, when the second RSRP is greater than or equal to the first RSRP_thd, the resource occupied by the other transmitting terminal device is excluded from the first set of resources.

In at least one embodiment, if the terminal device performing the sensing detects that the transmission power of the other terminal device is greater than or equal to the transmission power for the data to be transmitted by the terminal device performing the sensing, the terminal device performing the sensing does not adjust the PSSCH-RSRP.

For example, as illustrated in FIG. 1, suppose that UE1 is sensing, UE1 can detect the PSCCH of the other transmitting terminal device UE3 and learn that the transmission power of UE3 is 23 dBm, which is 10 dBm greater than the transmission power of UE1, and thus UE1 does not adjust the measured PSSCH-RSRP of UE3 during the sensing.

For example, as illustrated in FIG. 1, suppose that UE3 is sensing, the transmission power of UE1, PtUE1, is 10 dBm, and the transmission power of UE3, PtUE3, is 23 dBm. The UE3 determines based on priorities P1 and P2 that the first RSRP threshold RSRP_thd is 4 dB. UE3 measures that the first PSSCH-RSRP1 of UE1 is 5 dB.

The first PSSCH-RSRP1 is adjusted based on the transmission power of the other transmitting terminal device and the transmission power for the data to be transmitted by the terminal device, to obtain the second PSSCH-RSRP2. For example, PSSCH-RSRP2=5±(23−10)=18 dB. The PSSCH-RSRP2 is compared with the RSRP_thd. If the PSSCH-RSRP2 is greater than or equal to the RSRP_thd, the transmission resource used by UE1 is excluded. If the PSSCH-RSRP2 is smaller than the RSRP_thd, it is determined that the transmission resource used by UE1 is available.

Scheme 3

Figure 6:
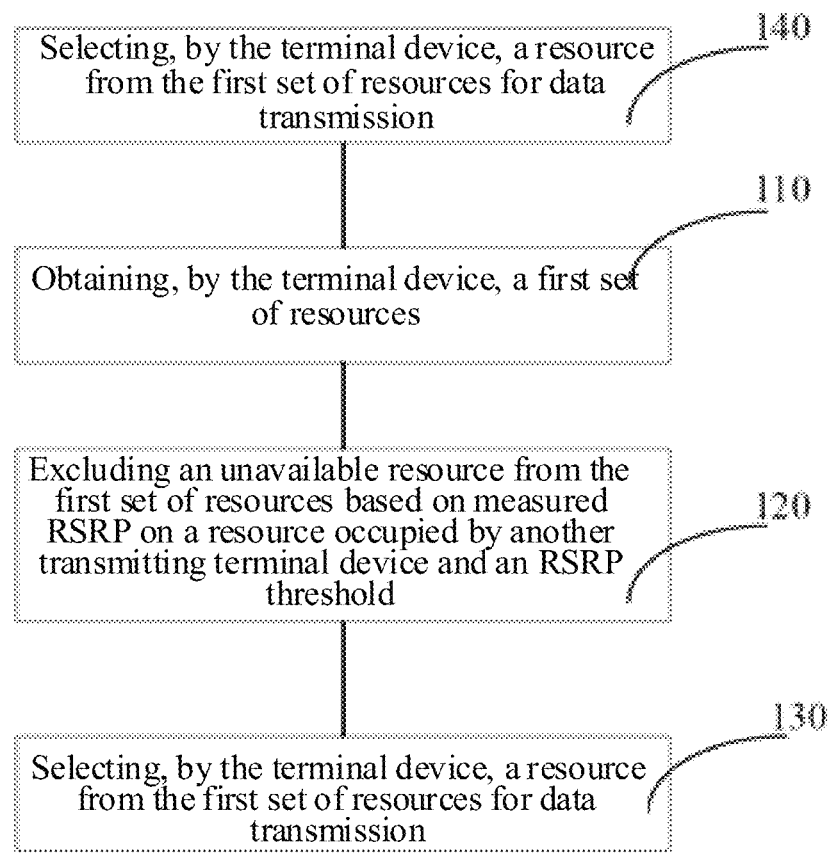
FIG. 6 is a flowchart illustrating Scheme 3 of Embodiment 2.

With continued reference to FIG. 6, in at least one embodiment, in combination with the above Scheme 1 and Scheme 2, the method further includes the following operations in Embodiment 2 of the present disclosure.

At block 140, the power control of the terminal device within a time window is limited. The time window can be configured by the network or obtained in a predetermined manner.

Specifically, the operation at block 140 may be controlling the terminal device not to perform the power control within the time window. The power control can only be performed when switching from one time window to a next time window.

Specifically, the operation at block 140 may also be: in each time window, performing, by the terminal device, the power control based on an SL path loss when the terminal device transmits data for the first time, and performing no power control during other transmissions within the time window. That is, the transmission power is not adjusted based on the SL path loss.

In at least one embodiment, after the terminal device adjusts the transmission power based on the SL path loss, the adjusted transmission power indication information of the terminal device is carried in the SCI. The transmission power indication information can be, for example, the indication information set forth at block 1212 of Embodiment 2.

In Embodiment 2 of the present disclosure, if the terminal device that performs the sensing detects the PSCCH, the terminal device that performs the sensing may measure the reference signal (such as the RSRP) of the PSSCH scheduled by the PSCCH. If the measured RSRP is greater than or equal to the RSRP threshold, the resource is determined as unavailable and the resource needs to be excluded. However, considering that the other transmitting terminal device may perform the power control in the NR-V2X, the RSRP for the reference signal of the other transmitting terminal device may be relatively low, and thus the resource may be mistakenly determined as available. Therefore, it is necessary to adjust the RSRP_thd or the measured PSSCH-RSRP based on the difference between the transmission power of the other transmitting terminal device and the transmission power for the data to be transmitted by the terminal device. The resource occupied by the other terminal device with a considerably different transmission power is excluded from the first set of resources to correct misjudgment of whether a transmission resource is available due to a difference in the transmission power, thereby avoiding occupying the transmission resource of the terminal device having low transmission power and avoiding interfering with the transmission of the terminal device having the low transmission power.

Embodiment 3

Figure 7:
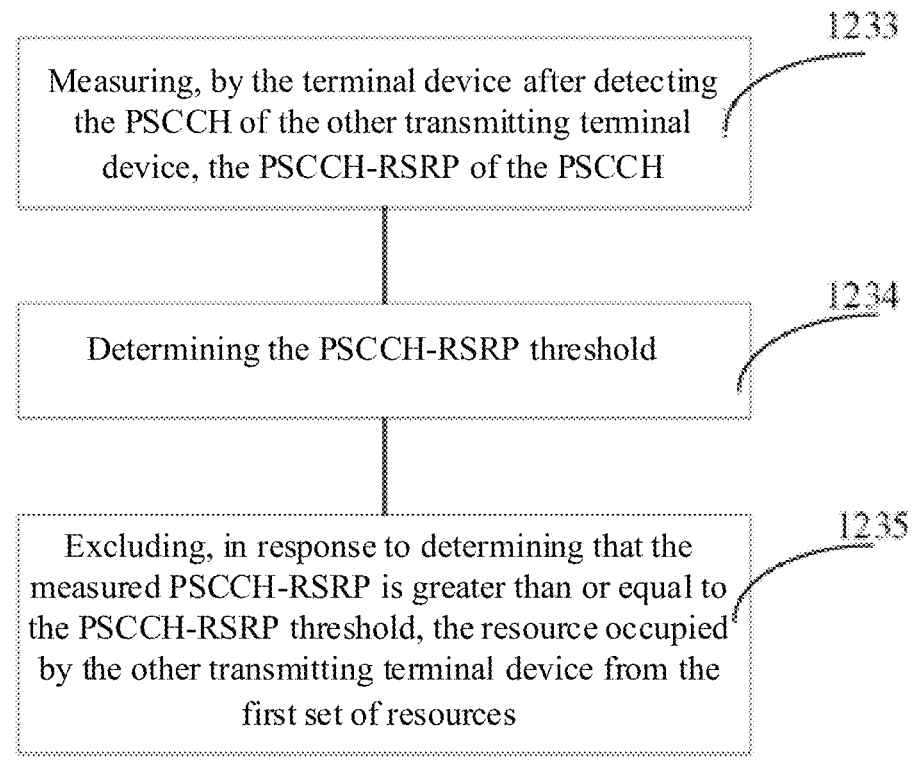
FIG. 7 is a flowchart illustrating a resource selection method in a D2D system according to Embodiment 3 of the present disclosure.

FIG. 7 is a flowchart illustrating a resource selection method in a D2D system according to Embodiment 3 of the present disclosure.

In Embodiment 3, block 110 and block 130 are the same as in Embodiment 1. Embodiment 3 is different from Embodiment 1 described above in that the operation at block 120 specifically includes the following operations.

At block 1233, after detecting the PSCCH of the other transmitting terminal device, the terminal device measures the PSCCH-RSRP of the PSCCH. In at least one embodiment, the reference signal is a DMRS of the PSCCH.

At block 1234, the PSCCH-RSRP threshold (PSCCH-RSRP_thd) is determined. In at least one embodiment, the threshold is determined based on the priority information P1 in the SCI carried in the PSCCH and the priority P2 of the data to be transmitted by the terminal device. For a specific method for determining the threshold, reference can be made to the description in Embodiment 2, and details thereof will be omitted here.

At block 1235, when it is determined that the measured PSCCH-RSRP is greater than or equal to the PSCCH-RSRP threshold, the resource occupied by the other transmitting terminal device is excluded from the first set of resources. That is, when the PSCCH-RSRP is greater than or equal to the threshold, the transmission resource occupied by the other terminal device is determined as unavailable; otherwise, the transmission resource occupied by the other terminal device is determined as available.

In at least one embodiment, the operation at block 120 further includes the following operations.

At block 1231, the power control is performed on the PSCCH of the other terminal device in a broadcast manner. That is, downlink path loss is considered in the power control, and the SL path loss is not considered; or the power control is not performed on the PSCCH based on the SL path loss; or the power control is not performed on the PSCCH; or the PSCCH is transmitted with the maximum transmission power. The maximum transmission power may be the maximum transmission power that the terminal device can support, or the maximum transmission power configured by the network.

In at least one embodiment, the operation at block 120 can further include the following operations.

At block 1232, the power control is performed on the PSSCH of the other terminal device in a unicast or multicast manner. That is, the downlink path loss and/or the SL path loss are considered in the power control. When the terminal device performs the power control in the unicast or multicast manner, the transmission power of the terminal device can be determined based on the downlink path loss between the terminal device and the network, or determined based on the SL path loss between the terminal device and a receiving-end terminal device, or determined based on both the downlink path loss and the SL path loss.

Figure 8:
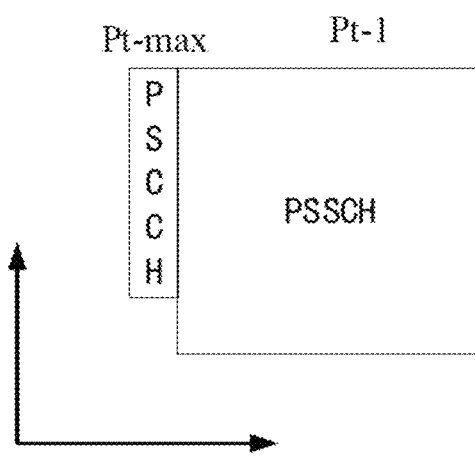
FIG. 8 is a schematic diagram showing a PSCCH and a PSSCH occupying different time domain resources in Embodiment 3.

In at least one embodiment, the PSCCH and the PSSCH may use different time domain resources for data transmission. Since the PSCCH uses the maximum transmission power for transmission, and the power control is performed on the PSSCH based on the SL path loss, the PSCCH and the PSSCH can use different time domain resources for transmission. The PSCCH and the PSSCH may be located in the same or different slots/subframes. As illustrated in FIG. 8, Pt−1≤Pt-max. Pt-max represents the maximum transmission power, and Pt−1 represents the transmission power determined based on the SL path loss.

Since the terminal device that performs the sensing needs to detect the PSCCH of the other transmitting terminal device, the transmission resource of the PSSCH can be obtained based on the PSCCH, and the PSSCH-RSRP of the reference signal of the PSSCH is measured and compared with the RSRP threshold to determine whether the resource used by the PSSCH is available. However, since the power control may reduce a transmission range of the PSCCH or reduce a measurement value of the PSSCH-RSRP, another terminal device cannot detect that the terminal device has occupied the transmission resource, and thus may mistakenly determine that the resource is available.

In Embodiment 3 of the present disclosure, the power control is performed on the PSSCH in the unicast or multicast manner, and the transmission power of the PSCCH is determined in the broadcast manner. That is, no power control is performed on the PSCCH, or the power control is performed on the PSCCH based on the downlink path loss. Therefore, determining whether the resource is available based on the measured PSCCH-RSRP will not cause misjudgment, thereby avoiding a situation of occupying the transmission resource of a user at low transmission power.

Embodiment 4

Figure 9:
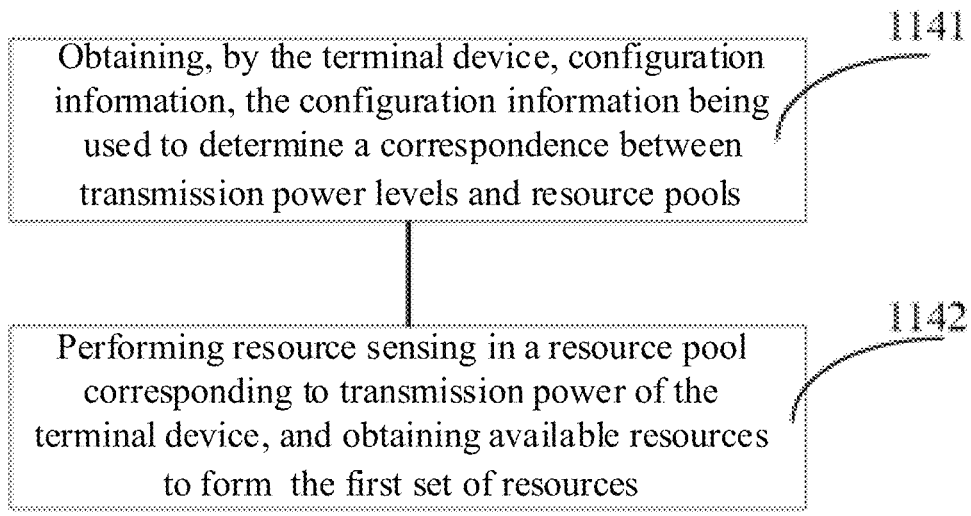
FIG. 9 is a flowchart illustrating a resource selection method in a D2D system according to Embodiment 4 of the present disclosure.

FIG. 9 is a flowchart illustrating a resource selection method in an Internet of vehicles system according to Embodiment 4 of the present disclosure. In Embodiment 4, block 130 is the same as in Embodiment 1. Differences between Embodiment 3 and Embodiment 1 described above are as follows.

Specifically, the operation at block 110 includes the following operations.

Figure 10:
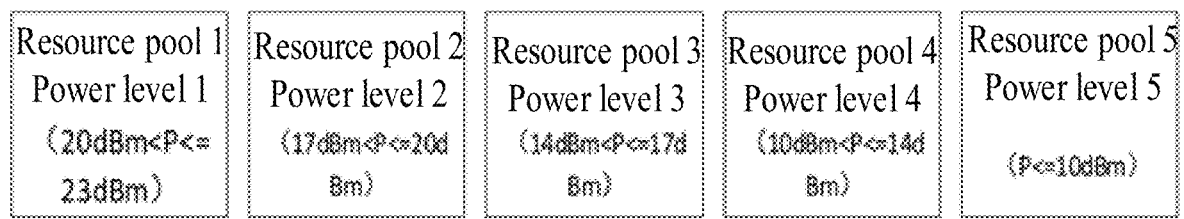
FIG. 10 is schematic diagram showing a resource pool in Embodiment 4.

At block 1141, the terminal device obtains configuration information. The configuration information is used to determine a correspondence between transmission power levels and resource pools. As illustrated in FIG. 10, the transmission power of the terminal device can be divided into different levels. Terminal devices at a same transmission power level use resources in a same resource pool, or each resource pool can also correspond to a plurality of power levels. Alternatively, there is no power level. That is, each resource pool corresponds to one power range. The terminal device determines a corresponding resource pool based on the transmission power of the terminal device.

In at least one embodiment, the configuration information is configuration information transmitted by the network or pre-configuration information.

At block 1142, the first set of resources is obtained in a resource pool corresponding to transmission power of the terminal device.

Specifically, the operation at block 120 includes excluding, in response to determining that the measured RSRP on the PSSCH scheduled by the resource occupied by the other transmitting terminal device is greater than or equal to the RSRP_thd, the resource from the first set of resources. Since the transmission powers of the terminal devices in the same resource pool are at the same power level, i.e., the transmission powers of the terminal devices do not differ greatly from each other, a process of sensing or selecting a resource from the resource pool can continue to use an existing process of sensing and selecting a resource, without adjusting the RSRP_thd threshold or adjusting the measured PSSCH-RSRP. A resource selection process can include the following operations.

The terminal device determines a PSSCH-RSRP threshold.

The terminal device measures, after detecting a PSCCH of the other transmitting terminal device, an RSRP of a PSSCH scheduled by the PSCCH to obtain a PSSCH-RSRP.

The terminal device excludes, when the PSSCH-RSRP is greater than or equal to the PSSCH-RSRP threshold, the resource occupied by the other transmitting terminal device from the first set of resources.

In at least one embodiment, the method further includes an operation at block 140 between block 120 and 130.

At block 140, when the resource pool corresponding to the terminal device changes due to a change of the transmission power of the terminal device, the resource pool corresponding to the terminal device is switched. The operations at blocks 110 and 120 are restarted, to perform sensing and resource selection in the switched resource pool.

In Embodiment 4 of the present disclosure, the resource pools are divided based on the power levels, such that the transmission powers of terminal devices in the same resource pool are at the same power level with little difference, thereby preventing a sensing result from being affected due to a large difference in the transmission power, and avoiding a situation of occupying the transmission resource of the user at the low transmission power.

In at least one embodiment, the operation of "excluding the resource occupied by the other transmitting terminal device from the first set of resources" in Embodiment 1 to Embodiment 4 may include the following operations.

The terminal device obtains a first time interval.

The terminal device determines, based on resources of the PSCCH and/or the PSSCH, and the first time interval, a transmission resource used by the other terminal device for a next transmission.

The terminal device excludes, when a first resource belongs to the first set of resources and overlaps with the transmission resource used by the other terminal device for the next transmission, the first resource from the first set of resources.

For example, each transmission resource in the first set of resources includes four subbands (one subband includes a plurality of Physical Resource Blocks (PRBs) continuous in the frequency domain). For example, a transmission resource 1 includes subbands 1, 2, 3, 4 of a first slot in a resource selection window, a transmission resource 2 includes subbands 3, 4, 5, 6 of the first slot in the resource selection window, and a transmission resource 3 includes subbands 5, 6, 7, 8 of the first slot in a resource selection window. If a next transmission of the other terminal device uses the subband 3 involving the first slot in the resource selection window, the terminal device excludes all transmission resources that overlap with the subband 3 of the first slot from the first set of resources. That is, the transmission resource 1 and the transmission resource 2 are excluded.

The PSCCH of the other terminal device carries the first time interval. Specifically, the PSCCH of the other terminal device carries SCI, and the SCI carries the first time interval.

The transmission resource used by the other terminal device for the next transmission may be a transmission resource used for transmitting a new data packet, or a transmission resource used for transmitting retransmitted data.

The resource selection method according to Embodiment 1 to Embodiment 4 is applicable to any D2D system, and in particular, to the Internet of vehicles system.

Embodiment 5

Figure 11:
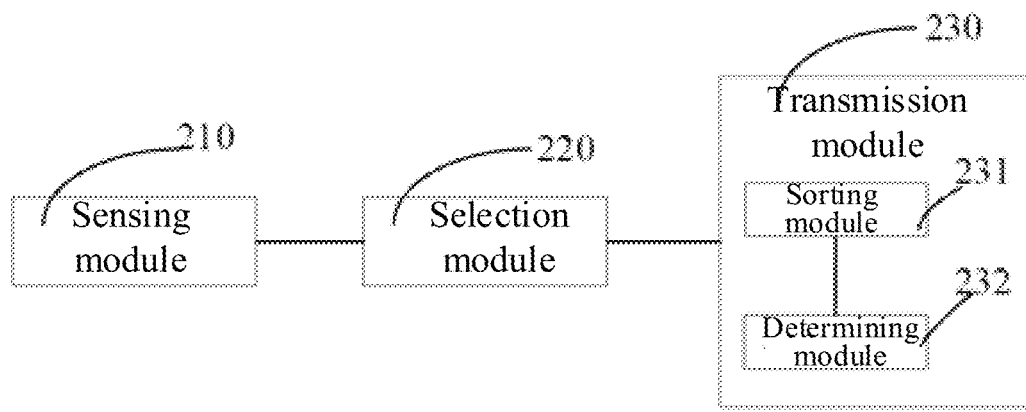
FIG. 11 is a block diagram showing a terminal device in a D2D system according to Embodiment 5 of the present disclosure.

FIG. 11 is a block diagram showing a terminal device in an Internet of vehicles system according to Embodiment 5 of the present disclosure. The terminal device includes a sensing module 210, a selection module 220, and a transmission module 230.

The sensing module 210 can be configured to obtain a first set of resources. Resources in the first set of resources are candidate transmission resources.

The selection module 220 can be configured to perform sensing to exclude an unavailable resource from the first set of resources based on measured RSRP on a resource occupied by another transmitting terminal device and an RSRP threshold.

The transmission module 230 can be configured to select a resource from the first set of resources for data transmission.

Specifically, the terminal device performs the selection in the first set of resources in accordance with a certain criterion. For example, the transmission module 230 specifically includes a sorting module 231 and a determining module 232.

The sorting module 231 can be configured to perform S-RSSI detection on the resources in the first set of resources, sort the resources by energy levels based on S-RSSI detection values, and place a part of the resources with the lowest energy into a second set of resources. The sorting module 231 performing the S-RSSI detection on the resources in the first set of resources includes performing an S-RSSI detection on resources in a sensing window, and calculating S-RSSIs of the resources in the first set of resources based on results of the S-RSSI detection.

The determination module 232 can be configured to select a resource from the second set of resources for data transmission. In at least one embodiment, the determination module 232 can be configured to select with equal probability a resource from the second set of resources for data transmission.

In at least one embodiment, the device further includes a reselection module 240. The reselection module 240 can be configured to increase, in response to determining that a number of available resources in the first set of resources is smaller than a threshold, the RSRP_thd by a certain value, such as 3 dB, after the selection module 220 performs the resource exclusion. Then, the reselection module 240 can invoke the sensing module 210 to re-enter a resource sensing and selection process.

In at least one embodiment, the first set of resources is a set of resources composed of resources in the resource selection window.

In at least one embodiment, a size of the candidate transmission resources is determined based on the data to be transmitted by the terminal device.

Embodiment 6

In a terminal device in a D2D system according to Embodiment 6 of the present disclosure, the sensing module 110 and the transmission module 130 are the same as in Embodiment 5. Embodiment 6 is different from Embodiment 5 in that the selection module 220 can be configured to: determine a difference between transmission power of the other transmitting terminal device and transmission power for data to be transmitted by the terminal device; adjust the measured RSRP on the resource occupied by the other transmitting terminal device based on the difference, or adjust the RSRP threshold based on the difference; and exclude the unavailable resource from the first set of resources based on the adjusted RSRP or the adjusted RSRP threshold. Specific implementations are as follows.

Example 1

Figure 12:
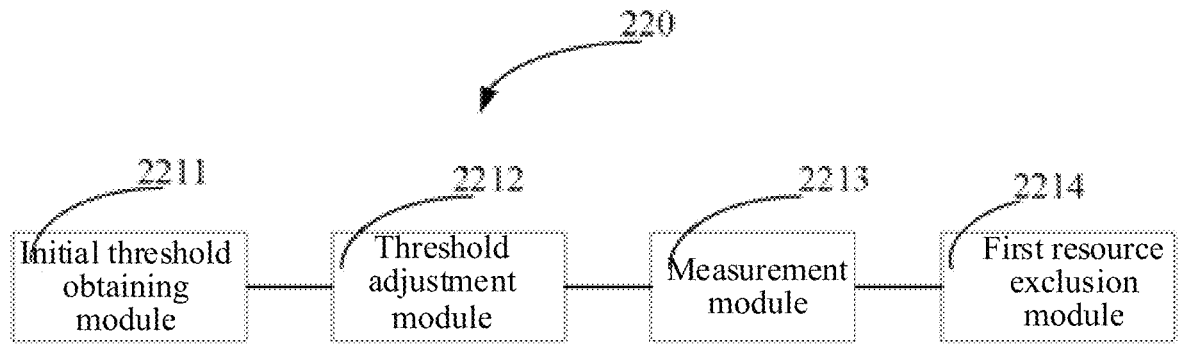
FIG. 12 is a block diagram showing Example 1 of Embodiment 5.

Referring to FIG. 12, the selection module 220 specifically includes an initial threshold obtaining module 2211, a threshold adjustment module 2212, a measurement module 2213, and a first exclusion module 2214.

The initial threshold obtaining module 2211 can be configured to determine a threshold of a PSSCH-RSRP, i.e., the first PSSCH-RSRP.

The threshold adjustment module 2212 can be configured to adjust the first RSRP_thd based on the transmission power of the other transmitting terminal device and the transmission power for the data to be transmitted by the terminal device, to obtain a second RSRP_thd. For the method for obtaining the transmission power of the other transmitting terminal device, reference may be made to the description of block 1212 in Embodiment 2, and details thereof will be omitted here.

The measurement module 2213 can be configured to measure, after detecting a PSCCH of the other transmitting terminal device, an RSRP on a PSSCH scheduled by the PSCCH to obtain a first PSSCH-RSRP.

The first exclusion module 2214 can be configured to exclude the unavailable resource from the first set of resources based on the threshold of the second PSSCH-RSRP and the first PSSCH-RSRP. Specifically, when the first PSSCH-RSRP of the PSSCH is greater than or equal to the second RSRP_thd, the occupied resource is excluded from the first set of resources.

In at least one embodiment, the threshold adjustment module 2212 may also be configured to determine not to adjust the RSRP_thd when the transmission power of the other terminal device is greater than or equal to the transmission power for the data to be transmitted by the terminal device that performs the sensing.

Example 2

Figure 13:
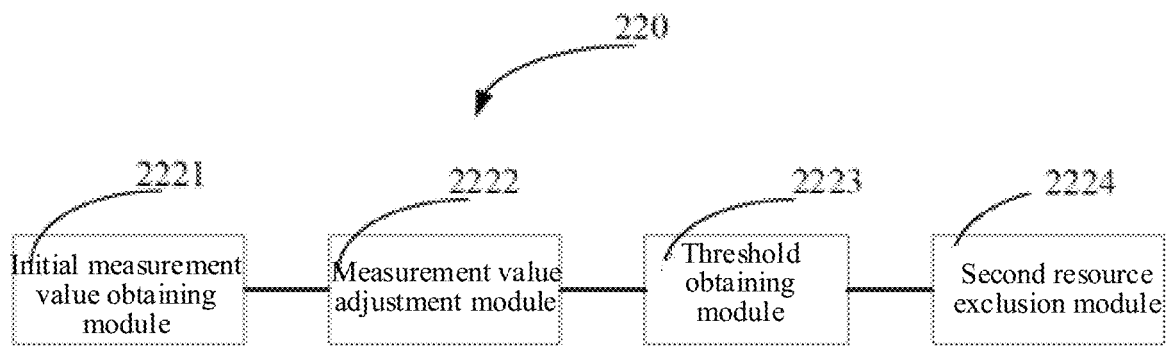
FIG. 13 is a block diagram showing Example 2 of Embodiment 5.

Referring to FIG. 13, the selection module 220 specifically includes an initial measurement value obtaining module 2221, a measurement value adjustment module 2222, a threshold obtaining module 2223, and a second resource exclusion module 2224.

The initial measurement value obtaining module 2221 can be configured to measure, after detecting a PSCCH of the other transmitting terminal device, a reference signal of a PSSCH scheduled by the PSCCH to obtain a first PSSCH-RSRP.

The measurement value adjustment module 2222 can be configured to adjust the first PSSCH-RSRP based on the transmission power of the other transmitting terminal device and the transmission power for the data to be transmitted by the terminal device, to obtain a second PSSCH-RSRP. Specifically, for the method for obtaining the transmission power of the other transmitting terminal device, reference may be made to the description of block 1212 in Embodiment 2, and details thereof will be omitted here.

The threshold obtaining module 2223 can be configured to determine a first RSRP_thd of the PSSCH.

The second resource exclusion module 2224 can be configured to exclude the unavailable resource from the first set of resources based on the first RSRP_thd and the second PSSCH-RSRP. Specifically, the second resource exclusion module 2224 can be configured to exclude, when the second RSRP is greater than or equal to the first RSRP_thd, the resource occupied by the PSSCH from the first set of resources.

In at least one embodiment, the measurement value adjustment module 2222 is further configured to determine not to adjust the first PSSCH-RSRP when the transmission power of the other terminal device is greater than or equal to the transmission power for the data to be transmitted by the terminal device.

Example 3

Figure 14:
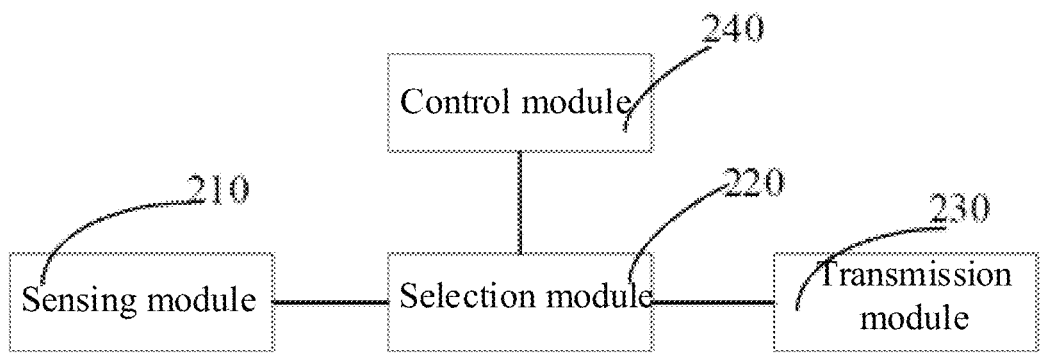
FIG. 14 is a block diagram showing Example 3 of Embodiment 5.

Referring to FIG. 14, in combination with Example 1 and Example 2, the terminal device according to Embodiment 6 of the present disclosure further includes a control module 240.

The control module 240 can be configured to limit the power control of the terminal device in a time window. The time window can be configured by the network or obtained in a predetermined manner.

Specifically, the control module 240 can be configured to control the terminal device not to perform the power control within the time window. The power control can only be performed when switching from one time window to a next time window.

Specifically, the control module 240 can also be configured to perform the power control based on the SL path loss when the terminal device performs data transmission for the first time in each time window, and perform no power control for other data transmissions within the time window. That is, the transmission power is not adjusted based on the SL path loss.

For what is not described in detail in Embodiment 6 of the present disclosure, reference may be made to Embodiment 2.

Embodiment 7

Figure 15:
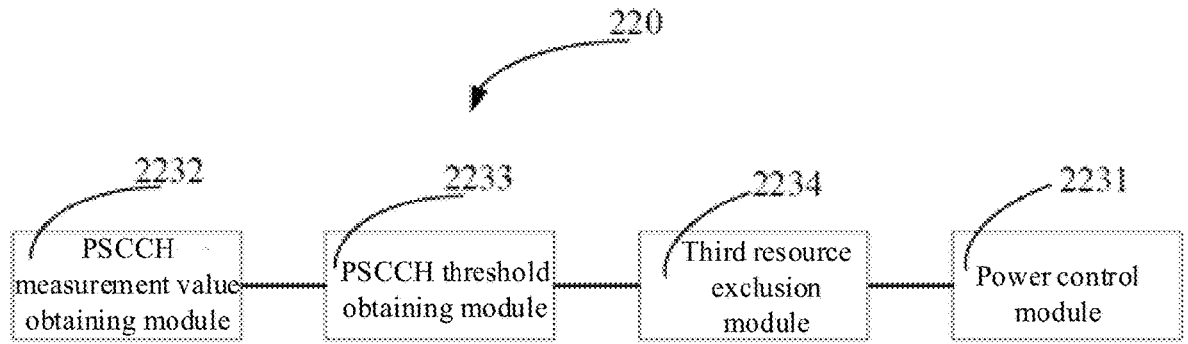
FIG. 15 is a block diagram showing a terminal device in a D2D system according to Embodiment 7 of the present disclosure.

FIG. 15 is a block diagram showing a terminal device in a D2D system according to Embodiment 7 of the present disclosure. Referring to FIG. 15, the sensing module 210 and the transmission module 230 are the same as in Embodiment 5. Embodiment 7 is different from Embodiment 5 in that the selection module 220 specifically includes a PSCCH measurement value obtaining module 2232, a PSCCH threshold obtaining module 2233, and a resource exclusion module 2234.

The PSCCH measurement value obtaining module 2232 can be configured to measure, after detecting a PSCCH of the other transmitting terminal device, a PSCCH-RSRP of the PSCCH. In at least one embodiment, the reference signal is the DMRS of the PSCCH.

The PSCCH threshold obtaining module 2233 can be configured to determine a PSCCH-RSRP threshold. In at least one embodiment, the threshold is determined based on the priority information P1 in the SCI carried in the PSCCH and the priority P2 of the data to be transmitted by the terminal device. For a specific method for determining the threshold, reference can be made to the description in Embodiment 2, and details thereof will be omitted here.

The resource exclusion module 2234 can be configured to exclude, when the measured PSCCH-RSRP is greater than or equal to the threshold, the resource occupied by the other transmitting terminal device from the first set of resources.

In at least one embodiment, the selection module 220 specifically further includes a power control module 2231.

The power control module 2231 can be configured to perform power control on the PSCCH in a broadcast manner. That is, downlink path loss is considered in the power control, and the SL path loss is not considered; or the power control is not performed on the PSCCH based on the SL path loss; or the power control is not performed on the PSCCH; or the PSCCH is transmitted with the maximum transmission power. The maximum transmission power may be the maximum transmission power that the terminal device can support, or the maximum transmission power configured by the network.

In at least one embodiment, the power control module 2231 can be further configured to perform the power control on the PSSCH in a unicast or multicast manner. When the terminal device performs the power control in the unicast or multicast manner, the transmission power of the terminal device can be determined based on the downlink path loss between the terminal device and the network, or determined based on the SL path loss between the terminal device and the receiving-end terminal device, or determined based on both the downlink path loss and the SL path loss.

In Embodiment 7 of the present disclosure, the power control is performed on the PSSCH in the unicast or multicast manner, and the transmission power of the PSCCH is determined in the broadcast manner. That is, no power control is performed on the PSCCH, or the power control is performed on the PSCCH based on the downlink path loss. Therefore, determining whether the resource is available based on the measured PSCCH-RSRP will not cause misjudgment, thereby avoiding a situation of occupying the transmission resource of the user at low transmission power. For what is not described in detail in Embodiment 7, reference may be made to Embodiment 3, and details thereof will be omitted here.

Embodiment 8

Figure 16:
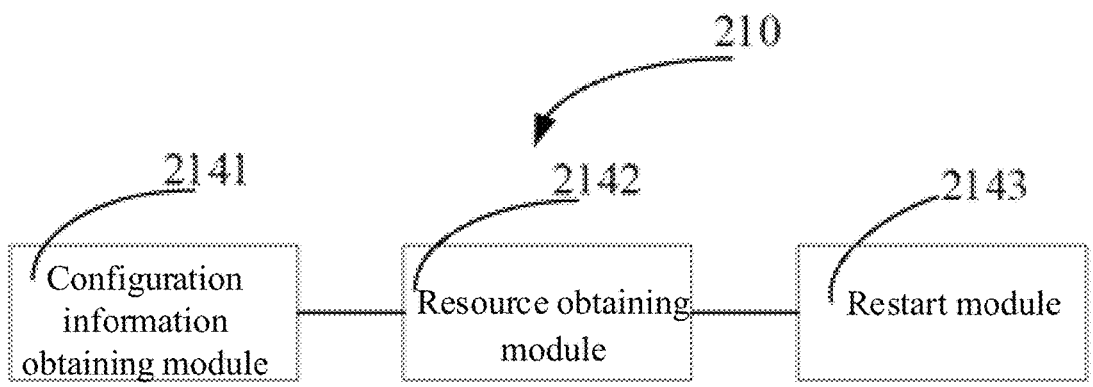
FIG. 16 is a block diagram showing a terminal device in a D2D system according to Embodiment 8 of the present disclosure.

FIG. 16 is a block diagram showing a terminal device in an Internet of vehicles system according to Embodiment 8 of the present disclosure. Referring to FIG. 16, the transmission module 230 is the same as in Embodiment 5. Embodiment 7 is different from Embodiment 5 in that the sensing module 210 specifically includes a configuration information obtaining module 2141 and a resource obtaining module 2142.

The configuration information obtaining module 2141 can be configured to obtain configuration information. The configuration information is used to determine a correspondence between transmission power levels and resource pools. In at least one embodiment, the configuration information is the configuration information transmitted by the network or the pre-configuration information.

The resource obtaining module 2142 is configured to obtain the first set of resources in a resource pool corresponding to transmission power of the terminal device.

The selection module 220 is specifically configured to exclude, in response to determining that the measured RSRP on the PSSCH scheduled by the resource occupied by the other transmitting terminal device is greater than or equal to the RSRP_thd, the resource from the first set of resources. In Embodiment 8, the existing resource sensing and selection method can be used without adjusting the RSRP_thd threshold or adjusting the measured PSSCH-RSRP.

In at least one embodiment, the sensing module 210 also includes a restart module 2143.

The restart module 2143 can be configured to switch, when the resource pool corresponding to the terminal device changes due to a change of the transmission power of the terminal device, the resource pool corresponding to the terminal device, and invoke the sensing module 210 and the selection module 220 to perform sensing and resource selection in the switched resource pool.

In Embodiment 8 of the present disclosure, the resource pools are divided based on the power levels, such that the transmission powers of terminal devices in the same resource pool are at the same power level with little difference, thereby preventing a sensing result from being affected due to a large difference in the transmission power, and avoiding a situation of occupying the transmission resource of the user at the low transmission power. For what is not described in detail in Embodiment 8, reference may be made to Embodiment 4, and details thereof will be omitted here.

In at least one embodiment, in Embodiment 5 to Embodiment 8, the selection module 220 further includes a determining module 2251, a resource determining module 2252, and an overlapping resource exclusion module 2253.

The determining module 2251 can be configured to determine a first time interval.

The resource determining module 2252 can be configured to determine, by the terminal device based on resources of the PSCCH and/or the PSSCH, and the first time interval, a transmission resource used by the other terminal device for a next transmission.

The overlapping resource exclusion module 2253 can be configured to exclude, when a first resource belongs to the first set of resources and overlaps with the transmission resource used by the other terminal device for the next transmission, the first resource from the first set of resources.

In at least one embodiment, the selection module 220 can be further configured to obtain the first time interval from the PSCCH of the other terminal device. The PSCCH of the other terminal device carries the first time interval. Specifically, the PSCCH of the other terminal device carries SCI. The SCI carries the first time interval.

The transmission resource used by the other terminal device for the next transmission may be the transmission resource used for transmitting a new data packet, or the transmission resource used for transmitting retransmitted data.

Embodiment 9

Figure 17:
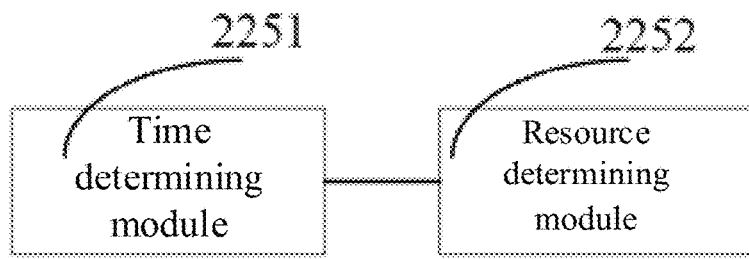
FIG. 17 is a block diagram showing added modules of an optimized selection module in Embodiment 5 to Embodiment 8.
Figure 18:
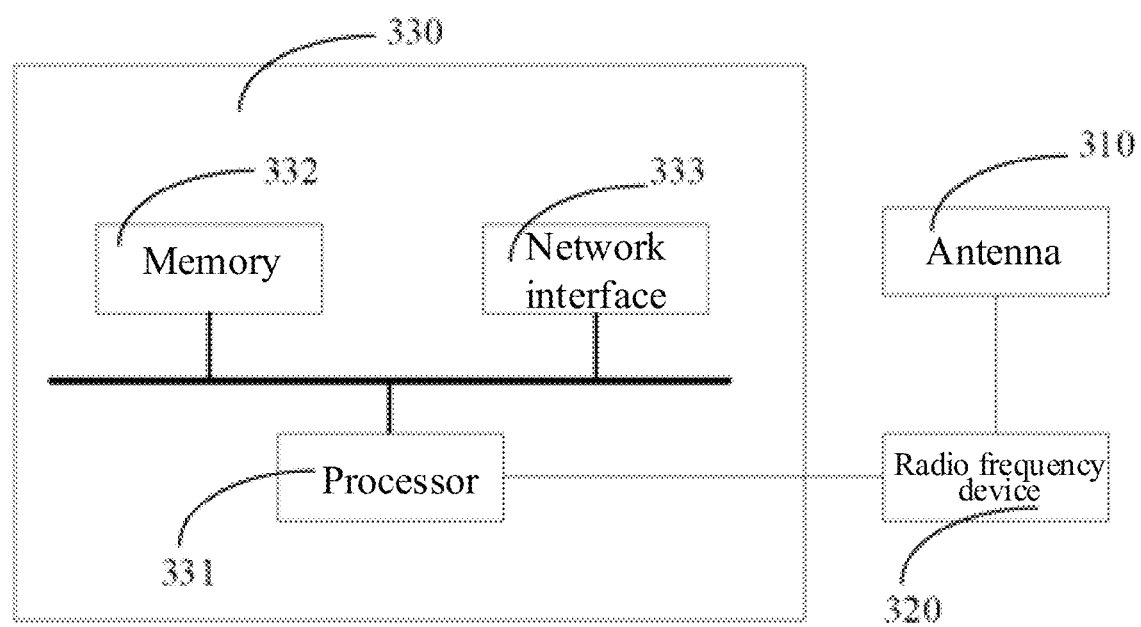
FIG. 18 is a schematic diagram showing a structure of a terminal device according to Embodiment 9 of the present disclosure.

FIG. 17 is a schematic diagram showing a structure of a terminal device 300 according to Embodiment 9 of the present disclosure. Referring to FIG. 17, the terminal device 300 may include an antenna 310, a radio frequency device 320, and a baseband device 330. In an uplink direction, the radio frequency device 320 can be configured to receive information uploaded by the terminal device through the antenna 310, and transmit the received information to the baseband device 330 for processing. In a downlink direction, the baseband device 330 can be configured to transmit processed information to the radio frequency device 320. The radio frequency device 320 may process the received information, and transmit it out through the antenna 310.

The baseband device 330 may execute operations of the resource selection method in the Internet of vehicles system according to Embodiment 1 to Embodiment 4.

Specifically, the baseband device 330 may include a processor 331, a memory 332, and a network interface 333. The processor 331 can be configured to invoke a program in the memory 332 to execute operations of an uplink control channel transmission method according to Embodiment 1. The network interface 333 exchanges information with the radio frequency device 320, and transmits signals processed by the processor 331 to the radio frequency device 320.

The processor 331 may be an independent component or a collective name for a plurality of processing components. For example, the processor 331 may be a Central Processing Unit (CPU), an Application Specific Integrated Circuit (ASIC), or one or more integrated circuits configured to implement the above method, such as at least one microprocessor or Digital Signal Processor (DSP), or at least one Field Programmable Gate Array (FPGA).

The present disclosure is described with reference to flowcharts and/or block diagrams of methods, devices (systems), and computer program products according to embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing devices to generate a machine, such that instructions executed by a processor of a computer or other programmable data processing devices can generate an apparatus for realizing functions specified in one or more processes in the flowcharts and/or one or more blocks in the block diagrams. The program may be stored in a computer-readable storage medium. The storage medium may include a Read Only Memory (ROM), a Random Access Memory (RAM), a magnetic disk, an optical disk, and the like.

The above embodiments illustrate but do not limit the present disclosure. Those skilled in the art can design various alternative examples within the scope of the claims. Those skilled in the art can appreciate that appropriate adjustments, modifications, etc. can be made to specific implementations within the scope of the present disclosure as defined by the attached claims. Therefore, any modifications and changes made in accordance with the spirit and principle of the present disclosure are within the scope of the present disclosure defined by the attached claims.

What is claimed is:

1. A resource selection method in a Device-to-Device (D2D) system, comprising:
    obtaining, by a terminal device, a first set of resources, wherein resources in the first set of resources are candidate transmission resources;
    performing sensing, by the terminal device, to exclude an unavailable resource from the first set of resources based on measured Reference Signal Received Power (RSRP) on a resource occupied by another transmitting terminal device and an RSRP threshold; and
    selecting, by the terminal device, a resource from the first set of resources for data transmission,
    wherein said performing sensing, by the terminal device, to exclude the unavailable resource from the first set of resources based on the measured RSRP on the resource occupied by the other transmitting terminal device and the RSRP threshold comprises:
    determining, by the terminal device, a difference between transmission power of the other transmitting terminal device and transmission power for data to be transmitted by the terminal device; adjusting, by the terminal device, the measured RSRP on the resource occupied by the other transmitting terminal device based on the difference, or adjusting, by the terminal device, the RSRP threshold based on the difference; and excluding, by the terminal device, the unavailable resource from the first set of resources based on the adjusted RSRP or the adjusted RSRP threshold.

2. The method according to claim 1, wherein said performing sensing, by the terminal device, to exclude the unavailable resource from the first set of resources based on the measured RSRP on the resource occupied by the other transmitting terminal device and the RSRP threshold comprises:
    determining, by the terminal device, a first Physical Sidelink Shared Channel (PSSCH)-RSRP threshold;
    adjusting the first PSSCH-RSRP threshold based on the difference between the transmission power of the other transmitting terminal device and the transmission power for the data to be transmitted by the terminal device, to obtain a second PSSCH-RSRP threshold;
    measuring, by the terminal device after detecting a Physical Sidelink Control Channel (PSCCH) of the other transmitting terminal device, an RSRP on a PSSCH scheduled by the PSCCH to obtain a first PSSCH-RSRP; and
    excluding, when the first PSSCH-RSRP is greater than or equal to the second PSSCH-RSRP threshold, the resource occupied by the other transmitting terminal device from the first set of resources.

3. The method according to claim 1, further comprising:
    determining, by the terminal device, transmission power of the other terminal device based on first indication information carried in a PSCCH.

4. The method according to claim 1, wherein said performing sensing, by the terminal device, to exclude the unavailable resource from the first set of resources based on the measured RSRP on the resource occupied by the other transmitting terminal device and the RSRP threshold comprises:
    measuring, by the terminal device after detecting a PSCCH of the other transmitting terminal device, a PSCCH-RSRP of the PSCCH;
    determining, by the terminal device, a PSCCH-RSRP threshold; and
    excluding, when the PSCCH-RSRP is greater than or equal to the PSCCH-RSRP threshold, the resource occupied by the other transmitting terminal device from the first set of resources.

5. The method according to claim 4, further comprising:
determining, by the terminal device, the PSCCH-RSRP threshold based on priority information carried in the PSCCH of the other terminal device and priority information of data to be transmitted by the terminal device.

6. The method according to claim 4, further comprising: performing power control on the PSCCH of the other terminal device in a broadcast manner.

7. The method according to claim 4, further comprising: performing power control on a PSSCH of the other terminal device in a unicast or multicast manner.

8. The method according to claim 1, wherein said obtaining, by the terminal device, the first set of resources comprises:
obtaining, by the terminal device, configuration information, the configuration information being used to determine a correspondence between transmission power levels and resource pools; and
obtaining, by the terminal device, the first set of resources in a resource pool corresponding to transmission power of the terminal device.

9. The method according to claim 8, wherein said performing sensing, by the terminal device, to exclude the unavailable resource from the first set of resources based on the measured RSRP on the resource occupied by the other transmitting terminal device and the RSRP threshold comprises:
determining, by the terminal device, a PSSCH-RSRP threshold;
measuring, by the terminal device after detecting a PSCCH of the other transmitting terminal device, an RSRP of a PSSCH scheduled by the PSCCH to obtain a PSSCH-RSRP; and
excluding, when the PSSCH-RSRP is greater than or equal to the PSSCH-RSRP threshold, the resource occupied by the other transmitting terminal device from the first set of resources.

10. A terminal device in a Device-to-Device (D2D) system, the terminal device comprising a processor and a memory, wherein the memory stores at least one instruction, and the at least one instruction is loaded and executed by the processor to perform operations comprising:
obtaining a first set of resources, wherein resources in the first set of resources are candidate transmission resources;
performing sensing, to exclude an unavailable resource from the first set of resources based on measured Reference Signal Received Power (RSRP) on a resource occupied by another transmitting terminal device and an RSRP threshold; and
selecting a resource from the first set of resources for data transmission,
wherein said performing sensing to exclude the unavailable resource from the first set of resources based on the measured RSRP on the resource occupied by the other transmitting terminal device and the RSRP threshold comprises: determining a difference between transmission power of the other transmitting terminal device and transmission power for data to be transmitted by the terminal device; adjusting the measured RSRP on the resource occupied by the other transmitting terminal device based on the difference, or adjusting the RSRP threshold based on the difference; and excluding the unavailable resource from the first set of resources based on the adjusted RSRP or the adjusted RSRP threshold.

11. The terminal device according to claim 10, wherein said performing sensing to exclude the unavailable resource from the first set of resources based on the measured RSRP on the resource occupied by the other transmitting terminal device and the RSRP threshold comprises:
determining a first RSRP threshold of a Physical Sidelink Shared Channel (PSSCH);
adjusting the first PSSCH-RSRP threshold based on the difference between the transmission power of the other transmitting terminal device and the transmission power for the data to be transmitted by the terminal device, to obtain a second PSSCH-RSRP threshold;
measuring, after detecting a Physical Sidelink Control Channel (PSCCH) of the other transmitting terminal device, an RSRP on a PSSCH scheduled by the PSCCH to obtain a first PSSCH-RSRP; and
excluding, when the first PSSCH-RSRP is greater than or equal to the second PSSCH-RSRP threshold, the resource occupied by the other transmitting terminal device from the first set of resources.

12. The terminal device according to claim 10, wherein the operations further comprise:
determining transmission power of the other terminal device based on first indication information carried in a PSCCH.

13. The terminal device according to claim 10, wherein said performing sensing to exclude the unavailable resource from the first set of resources based on the measured RSRP on the resource occupied by the other transmitting terminal device and the RSRP threshold comprises:
measuring, after detecting a PSCCH of the other transmitting terminal device, a PSCCH-RSRP of the PSCCH;
determining an RSRP threshold of the PSCCH; and
excluding, when the PSCCH-RSRP is greater than or equal to the PSCCH-RSRP threshold, the resource occupied by the other transmitting terminal device from the first set of resources.

14. The terminal device according to claim 13, wherein the operations further comprise: determining the PSCCH-RSRP threshold based on priority information carried in the PSCCH of the other terminal device and priority information of data to be transmitted by the terminal device.

15. The terminal device according to claim 13, wherein the operations further comprise:
performing power control on transmission power of the PSCCH in a broadcast manner.

16. The terminal device according to claim 13, wherein the operations further comprise:
performing power control on transmission power of a PSSCH in a unicast or multicast manner.

17. The terminal device according to claim 10, wherein said obtaining the first set of resources comprises:
obtaining configuration information, the configuration information being used to determine a correspondence between transmission power levels and resource pools; and
obtaining the first set of resources in a resource pool corresponding to transmission power of the terminal device.

18. The terminal device according to claim 17, wherein said performing sensing to exclude the unavailable resource from the first set of resources based on the measured RSRP on the resource occupied by the other transmitting terminal device and the RSRP threshold comprises:
determining a PSSCH-RSRP threshold;

measuring, after detecting a PSCCH of the other transmitting terminal device, an RSRP of a PSSCH scheduled by the PSCCH to obtain a PSSCH-RSRP; and excluding, when the PSSCH-RSRP is greater than or equal to the PSSCH-RSRP threshold, the resource occupied by the other transmitting terminal device from the first set of resources.

\* \* \* \* \*